Figure 1:
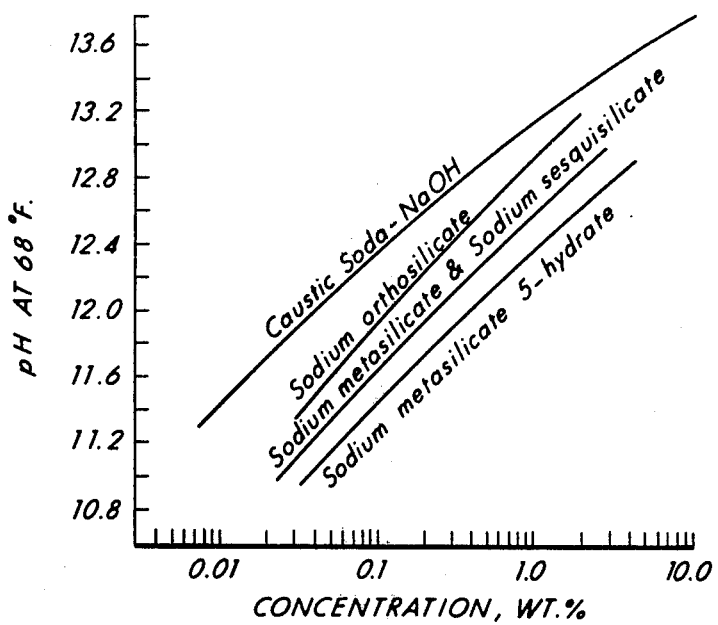

United States Patent [19]
Sarem

[11] 3,920,074
[45] Nov. 18, 1975

[54] METHOD FOR IMPROVING THE INJECTIVITY OF WATER INJECTION WELLS

[75] Inventor: Amir M. Sarem, Yorba Linda, Calif.

[73] Assignee: Union Oil Company of California, Brea, Calif.

[22] Filed: Apr. 19, 1974

[21] Appl. No.: 462,585

[52] U.S. Cl................................ 166/274; 166/275
[51] Int. Cl.² ........................................ E21B 43/22
[58] Field of Search ........... 166/273, 274, 275, 282, 166/305 R, 271

[56] References Cited
UNITED STATES PATENTS

| | | | |
|---|---|---|---|
| 2,920,041 | 1/1960 | Meadors............................. | 166/275 |
| 3,777,817 | 12/1973 | Feuerbacher et al............... | 166/273 |

FOREIGN PATENTS OR APPLICATIONS

| | | | |
|---|---|---|---|
| 701,136 | 1/1965 | Canada.............................. | 166/274 |

Primary Examiner—Stephen J. Novosad
Assistant Examiner—George A. Suckfield
Attorney, Agent, or Firm—Richard C. Hartman; Dean Sandford; Gerald L. Floyd

[57] ABSTRACT

The injection rate of water into water injection wells that exhibit low injectivity because of oil saturation in the formation adjacent to the well can be increased by introducing a small quantity of a dilute aqueous solution of alkaline alkali metal silicate through the injection well, and thereafter displacing this solution into the formation with subsequently injected flood water. The dilute aqueous alkaline alkali metal silicate solution can be injected as an oil-in-water emulsion of the solution and a crude petroleum of the type that exhibits reduced interfacial tension with water at high pH.

12 Claims, 2 Drawing Figures

METHOD FOR IMPROVING THE INJECTIVITY OF WATER INJECTION WELLS

This invention relates to the recovery of oil from subterranean reservoirs by a waterflood process. More specifically, this invention relates to improving the injection rate of water into input wells in a waterflood process.

It has long been recognized that substantial amounts of oil remain unrecovered at the completion of normal primary recovery operations. In order to improve the recovery of oil, it is common practice to supplement the native reservoir energy by various means including the use of water to displace oil from a formation, which process is conventionally called waterflooding. A waterflood process, briefly, comprises introducing water into a formation through at least one input well, forcing the water through the formation toward at least one output well, and recovering through the output well the oil that is displaced from the formation by the water.

One of the principal problems encountered in waterflooding is the economical injection of a sufficient quantity of water to carry out the process. Reduced water injectivity can be caused by the presence of oil in the formation around the input well. A condition of oil saturation in porous rock material substantially reduces the effective permeability of the rock to the flow of water, necessitating increased injection pressures to force the water into the formation. The higher pressure not only increases the cost of injecting water, but in many fields the injection rates are limited because or pressure limitations of the well casings or because the fracturing pressure of the formation cannot be exceeded.

It has heretofore been proposed to increase the permeability of the formation around the well to water by reducing the oil saturation of the formation. Specifically, it has been proposed that oil saturation be reduced by injecting solvents such as carbon dioxide, acetone, ethyl alcohol, isopropyl alcohol, n-propyl alcohol, diacetone alcohol, butyl Cellosolve, butyl Carbitol, dioxane, liquid ammonia and alternate slugs of liquid hydrocarbon and liquid ammonia. Various micellar solutions, soluble oils, and the like, have also been used to displace oil from the formation immediately surrounding the well. While these solvents are more or less effective in reducing oil saturation in the formation, excessive quantities of solvent are in some cases required to completely remove the oil. Also, many of the suggested solvents are expensive. Hence, need exists for a simple, inexpensive method for treating a formation adjacent to the well to substantially completely remove oil therefrom.

Accordingly, a principal object of the present invention is to improve the water injectivity of an input well in a waterflooding process.

Another object of the invention is to provide a process for reducing the oil saturation in that portion of an oil-bearing formation surrounding a water injection well.

A still further object of this invention is to provide a simple, inexpensive method for substantially completely removing oil from the formation adjacent to a water injection well.

Other objects and advantages of the invention will be apparent from the following description.

Briefly, this invention provides a process for improving the injectivity of water into water injection wells that exhibit low injectivity because of oil saturation in the formation adjacent to the well. Water injectivity is increased by introducing a small quantity of dilute aqueous solution of alkaline alkali metal silicate through the injection well, and thereafter displacing this solution into the formation with subsequently injected flood water. This treatment emulsifies the oil in the formation adjacent to the well and facilitates its displacement away from the well by the subsequently injected flood water. Where the reservoir oil is of the type that does not readily emulsify with the alkaline alkali metal silicate solution, the silicate solution can be injected in the form of an oil-in-water emulsion of the solution and a crude petroleum of the type that exhibits reduced interfacial tension with water at high pH.

Because of the radial flow system involved in injecting fluids from a well outwardly into a surrounding permeable formation, that portion of the formation immediately adjacent to the well is most critical with respect to restricting the rate of injection of fluid into the formation. Hence, the restriction on the flow of water from the well into the formation due to oil blockage can be substantially reduced by removing oil from only that portion of the formation immediately adjacent to the well. Oil blockage can be effectively minimized by removing oil from the strata of the formation into which water is to be injected to a distance of 5 to 10 feet from the well.

Crude petroleum is known to contain varying amounts of saponifiable materials such as petroleum acids which react with alkaline materials to form soaps that reduce the interfacial tension between the crude petroleum and water. The petroleum acids found in any particular crude petroleum can include various carboxylic acids and phenolic acids. Saponification of these acids forms surface active agents that reduce the interfacial tension between the crude petroleum and water. The amount of these saponifiable materials in a crude petroleum and their effect upon the surface active properties of the system can be characterized by the variation of the interfacial tension of the oil-water system as a function of pH. The interfacial tension of a typical crude petroleum-water system at low pH is usually about 20 to 40 dynes/cm. Those crude oils having significantly high contents of saponifiable materials are characterized by reduced interfacial tension at high pH. The method of this invention is particularly applicable to the treatment of water injection wells in formations containing crude petroleum that exhibits an interfacial tension with water at a high pH of 5 dynes/cm or less, and more particularly to crude petroleum that exhibits an interfacial tension of 2 dynes/cm or less.

Oil can be removed from an oil-bearing formation by displacement with water down to a residual oil saturation of about 20 to 35 pore volume percent, but cannot be removed below the residual saturation by water displacement alone. Residual oil can be substantially completely removed from the formation adjacent to the well by emulsification with the alkaline alkali metal silicate solution and displacement of the emulsion outwardly into the formation by the subsequently injected flood water. By the term "substantially completely removed", as used herein, it is meant that almost all of the residual oil is removed from the formation adjacent to the well. More specifically, it is preferred that the oil saturation of the formation adjacent to the well be reduced to less than about 5 percent of the pore volume, and more preferably, to less than about 2 percent. Because of the high displacement efficiency of the injected fluids, the formation adjacent to the well can be substantially denuded of oil by displacing only a small quantity of the high pH silicate solution or an emulsion of this solution therethrough.

Where the reservoir oil is not readily emulsified at high pH, i.e., the interfacial tension of the oil is not reduced to less than about 5 dynes/cm at high pH, it is within the scope of this invention to form an emulsion of the dilute aqueous alkaline alkali metal silicate solution and an emulsifiable crude petroluem and to inject a small quantity of this emulsion sufficient to mobilize the residual oil in the formation immediately adjacent to the injection well. The injected emulsion and mobilized residual oil is displaced outwardly into the reservoir by the subsequently injected flood water.

Figure 2:
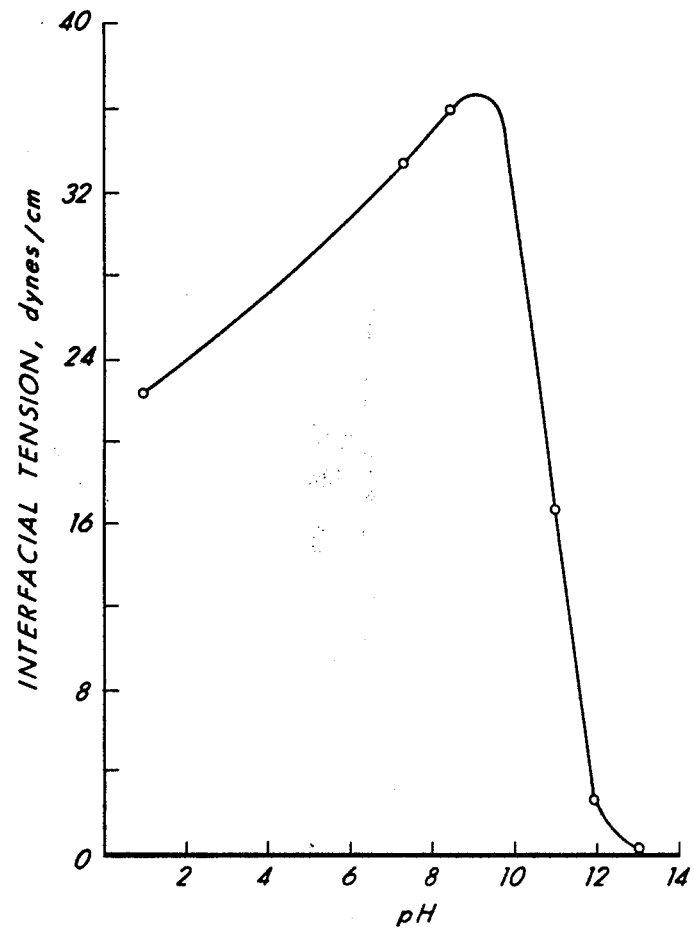

The invention is further described by reference to the appended drawing, wherein:

FIG. 1 is a graph illustrating the variation in the pH of aqueous solutions of various alkaline sodium silicates and sodium hydroxide as a function of the concentration of the alkaline material; and FIG. 2 is a graph illustrating the variation in the interfacial tension of a crude petroleum-water system with pH wherein the crude petroleum contains saponifiable petroleum acids.

The alkaline alkali metal silicate employed in the practice of this invention both for injection into the reservoir and for the preparation of the emulsion is an alkali metal silicate having a molar ratio of $M_2O/SiO_2$ of 1 and above, wherein M is an alkali metal atom, such as sodium, potassium, lithium, cesium and rubidium, exemplary of which are alkali metal orthosilicate, alkali metal metasilicate, alkali metasilicate pentahydrate, and alkali metal sequisilicate. Particular agents useful in the practice of the invention include sodium and potassium orthosilicate, sodium and potassium metasilicate, sodium and potassium metasilicate pentahydrate, and sodium and potassium sequisilicate. The pH of aqueous solutions containing various concentrations of alkaline sodium silicates are shown in FIG. 1. These alkaline sodium silicates generally provide lower pH solutions than equal weight concentration solutions of sodium hydroxide, but nevertheless, provide high pH solutions useful in reducing the interfacial tension of many crude petroleum-water systems. Sodium orthosilicate is a particularly preferred alkaline alkali metal silicate because of its relatively high pH.

In practicing the invention, the variation in interfacial tension between the crude petroleum in the reservoir to be treated and water as a function of pH is first determined. If the interfacial tension is significantly lowered in alkaline systems, i.e., the interfacial tension can be lowered to less than about 5 dynes/cm, and preferably to less than about 2 dynes/cm by pH adjustment, the pH required to obtain the desired interfacial tension is determined. The concentration of alkaline alkali metal silicate required to provide this pH is determiend from FIG. 1. Accordingly, it is within the scope of this invention to employ a concentration of alkaline alkali metal silicate effective to reduce the interfacial tension between the petroleum and water to less than about 5 dynes/cm, and preferably to less than about 2 dynes/cm, and most preferably to less than 1 dyne/cm. With most crude oils containing a significant quantity of saponifiable materials, interfacial tension reduction can be obtained by the addition of about 0.005 to 0.8 weight percent of alkaline alkali metal silicate, and preferably about 0.05 to 0.3 weight percent.

The alkaline alkali metal silicates used in the practice of this invention are available in solid form, and the respective alkaline alkali metal silicate solutions can be prepared by dissolving an appropriate quantity of the alkaline alkali metal silicate in water. However, in many cases it is more convenient and less costly to prepare the alkaline alkali metal silicate by adding caustic to an aqueous solution of a low-alkalinity alkali metal silicate having a $M_2O/SiO_2$ ratio of less than 1.

Where the reservoir oil is not readily saponifiable and emulsion is to be injected, a suitable emulsion can be prepared by admixing a saponifiable crude petroluem with a dilute aqueous solution of an alkaline alkali metal silicate solution. The emulsions formed in this manner exhibit high stability in that they do not readily separate into separate oil and water phases, and are not readily inverted to emulsions of the water-in-oil type.

The stability of an emulsion is indicated by the emulsion stability factor. The emulsion stability factor is measured by placing 50 ml of an oil, such as a crude petroleum to be tested, and 50 ml of an aqueous liquid in which it is to be emulsified in a 100 ml centrifuge tube. The centrifuge tube is shaken vigorously for one minute to thoroughly mix the liquid contents, and then maintained quiescent to permit the liquid phases to separate. The volume of separate liquid pahse is observed at various time periods. The emulsion stability factor is defined as the time in minutes required to separate 20 ml of water phase.

It is desired that the emulsions employed in the practice of this invention exhibit high emulsion stability factors, with emulsions exhibiting emulsion stability factors above about 20 being preferred, and emulsions exhibiting emulsion stability factors above about 50 being even more preferred.

Suitable emulsions can be prepared by admixing the saponifiable crude petroleum with the alkaline alkali metal silicate solution in the proportions of about 0.3 to 3 volumes of crude petroleum per volume of alkaline alkali metal silicate solution, and preferably in the proportions of about 0.5 to 2 volumes of crude petroleum per volume of alkali metal silicate solution. The dilute alkaline alkali metal silicate solutions employed in the emulsification step are aqueous solutions containing about 0.005 to 0.8 weight percent of alkaline alkali metal silicate, and preferably about 0.05 to 0.3 weight percent of alkaline alkali metal silicate, in fresh water.

Where water injectivity is restricted by high oil saturation in the formation immediately adjacent to the injection well, suitable water injection rates can be obtained by substantially completely removing the oil from the formation to a distance of 5 to 10 feet from the well. The reservoir oil can be substantially completely removed from this portion of the formation by injecting about 0.1 to 10 barrels per foot of vertical formation thickness of dilute aqueous alkaline alkali metal silicate solution or an emulsion of this solution and an emulsifiable crude petroleum, and preferably from about 1 to 5 barrels per foot of these agents.

Also, where the connate water in the reservoir or the flood water being injected contains excessive quantities of divalent metal cations, such as calcium, barium and magnesium cations, that react with the alkali metal silicate to form a precipitate, it is preferred to precede and to follow the alkali metal silicate solution with a small slug of water that is low in divalent cations. In particular, where the connate water or the injection water contains more than about 15 ppm of divalent cations, it is preferred that the alkali metal silicate solution be protected from contact with these waters. Suitable protection can be obtained by injecting 5 to 10 barrels per vertical foot of formation-thickness of water containing less than bout 15 ppm of divalent cations. It is preferred that the water employed in the protective slugs have about the same total dissolved salt content as the flood water.

In the practice of this invention, the aqueous alkaline alkali metal silicate solution or the emulsified alkaline alkali metal silicate can be injected into the well either preceding a waterflood, or flood water injection can be interrupted and the treating agent introduced into the well at any time during the waterflood that it is desired to increase flood water injectivity. In the usual practice of placing a well in water injection service, water injection is first initiated to establish injection profiles and rates. Thereafter, if necessary, water injection is discontinued and a quantity of dilute aqueous alkline alkali metal silicate solution or an emulsion preferably amounting to not more than about 10 barrels per foot of vertical thickness of the zone to be waterflooded is introduced into the well. Water injection is then resumed to displace the soluble oil from the well outwardly into the formation. Where the water injection has been inhibited by oil blockage in the formation adjacent to the well, this step will be accompanied by an immediate reduction in injection pressure, or a corresponding increase in injection rate.

This invention is further described by the following examples which are illustrative of specific modes of practicing the invention and are not intended as limiting the scope of the invention as defined by the appended claims.

EXAMPLE 1

This example illustrates the improved water injectivity obtainable by the method of this invention. A cylindrical tube 10.5 cm long by 2.54 cm in diameter is packed with Nevada 130 sand. The model is saturated with distilled water, and then desaturated with a 12° API crude petroleum of the type exhibiting reduced interfacial tension with water at high pH. Oil saturation is about 83 percent of the pore volume.

Next, the model is waterflooded to residual oil saturation by injecting flood water at a constant pressure of about 26 psig at one end of the cylinder and recovering displaced fluids from the other end at substantially atmospheric pressure. The water injection rates obtained during the waterflood are reported in Table 1.

TABLE 1

| Flood Water Injected, ml. | Elapsed Time, Sec. | Water Injection Rate, ml/Sec. | Water Permeability, md |
|---|---|---|---|
| 60 | 1200 | 0.05 | — |
| 10 | 65.4 | 0.15 | 178 |
| 10 | 60.1 | 0.17 | 195 |
| 10 | 53.6 | 0.19 | 219 |
| 10 | 52.0 | 0.19 | 226 |
| 10 | 50.0 | 0.20 | 238 |
| 10 | 45.0 | 0.22 | 264 |

Upon completion of the waterflood, 36 ml of an aqueous solution containing 0.12 weight percent of sodium orthosilicate marketed by the Philadelphia Quartz Company under the trademark Metzo 200 is injected into the model and followed by the injection of additional flood water. The water injection rate stabilized at 0.9 ml/sec at a differential pressure of 26 psi. The water permeability is 1079 md. Thus, water injectivity is increased about four fold by treatment with the dilute aqueous sodium orthosilicate solution.

EXAMPLE 2

An aqueous alkaline sodium orthosilicate solution is prepared by admixing 0.958 parts by weight of a commercial low alkalinity sodium silicate containing 8.9 weight percent $Na_2O$ and 28.7 weight percent $SiO_2$ ($Na_2O/SiO_2$ weight ratio of 0.31) marketed by Philadelphia Quartz Company under the trademark PQ Sodium Silicate N, with 1.35 parts by weight of 50 weight percent sodium hydroxide solution. The resulting alkaline sodium orthosilicate solution is diluted with water to provide a dilute aqueous solution having the desired sodium orthosilicate concentration.

EXAMPLE 3

The practice of the method of this invention to increase water injectivity is illustrated by treatment of a water injection well employed in a commercial water flooding operation. The well is completed in 9 feet of oil sand with conventional perforated casing. The water injection rate is less than desired.

The variation in the interfacial tension between the produced oil and injected water as a function of pH is determined, and this relationship is substantially as illustrated in FIG. 2. Reduction of the interfacial tension to a value of about 2 dynes/cm required a pH of about 12.0. From FIG. 1 it is determined that a 0.12 weight percent solution of sodium orthosilicate is required to obtain this pH. The sodium orthosilicate solution is prepared substantially as described in Example 2 and diluted with water to a concentration of 0.12 weight percent.

The injection well is treated by interrupting the water injection and introducing approximately 45 barrels of the dilute aqueous alkaline sodium silicate solution into the injection well. The injection of flood water is then resumed.

EXAMPLE 4

This example illustrates the practice of the invention to increase the water injection rate into a formation containing oil of the type exhibiting an interfacial tension with water that is not greatly affected by pH. The well is completed in 20 feet of oil sand in conventional manner. The water injection rate through this well is less than desired.

An emulsion is prepared by admixing equal parts of an aqueous sodium orthosilicate solution containing 0.12 weight percent of sodium orthosilicate and crude petroleum of a type exhibiting an interfacial tension with water as a function of pH substantially as illustrated in FIG. 2. The resulting emulsion exhibits an emulsion stability factor above 120.

The injection well is treated by interrupting the water injection and introducing approximately 100 barrels of the emulsion into the well. The injection of flood water is then resumed.

Various embodiments and modifications of this invention have been described in the foregoing description and examples, and further modifications will be apparent to those skilled in the art. Such modifications are included within the scope of this invention as defined by the following claims.

Having now described the invention, I claim:

1. In the method for recovering oil from a subterranean formation wherein flood water is injected through an injection well and oil is recovered from one or more spaced production wells, and wherein the injection of said flood water is restricted by the presence of oil in the formation adjacent to the injection well, the improvement which comprises introducing through said injection well about 0.1 to 10 barrels per foot of vertical thickness of said formation of a dilute aqueous solution of an alkaline alkali metal silicate containing about 0.005 to 0.8 weight percent of said alkaline alkali metal silicate and having a molar ratio of $M_2O/SiO_2$ of 1 or above wherein M is an alkali metal atom, and thereafter injecting flood water to displace said solution into the formation.

2. The method defined in claim 1 wherein sufficient aqueous alkali metal silicate solution is injected to remove oil from said formation to a distance of about 5 to 10 feet from said injection well.

3. The method defined in claim 1 wherein said alkaline alkali metal silicate is sodium or potassium orthosilicate, sodium or potassium metasilicate, sodium or potassium metasilicate pentahydrate, or sodium or potassium sesquisilicate.

4. The method defined in claim 1 wherein said aqueous alkali metal silicate solution is injected in the form of an oil-in-water emulsion of said solution and a crude petroleum of the type that exhibits reduced interfacial tension at high pH.

5. The method defined in claim 4 wherein said emulsion is comprised of about 0.3 to 3 volumes of said crude petroleum per volume of said alkaline alkali metal silicate solution.

6. The method defined in claim 4 wherein said emulsion is characterized by an emulsion stability factor above about 20.

7. A method for improving the injectivity of water into a porous subterranean oil-bearing formation penetrated by a water injection well which comprises:

introducing through said injection well about 0.1 to 10 barrels per foot of vertical thickness of said formation of a dilute aqueous solution containing about 0.005 to 0.8 weight percent of an alkaline alkali metal silicate having a molar ratio of $M_2O/SiO_2$ of 1 or above wherein M is an alkali metal atom; and thereafter injecting water into said formation through said injection well.

8. The method defined in claim 7 wherein said alkaline alkali metal silicate is sodium or potassium orthosilicate, sodium or potassium metasilicate, sodium or potassium metasilicate pentahydrate, or sodium or potassium sesquisilicate.

9. The method defined in claim 7 wherein said aqueous alkali metal silicate solution is injected in the form of an emulsion comprised of about 0.3 to 3 volumes of a crude petroleum of the type that exhibits reduced interfacial tension at high pH per volume of said aqueous alkali metal silicate solution, said emulsion is characterized by an emulsion stability factor above about 20.

10. A method for improving the injectivity of water into a porous subterranean oil-bearing formation penetrated by a water injection well, which comprises:

injecting water through said injection well about 0.1 to 10 barrels per foot of vertical thickness of said formation of a dilute aqueous solution containing about 0.005 to 0.8 weight percent of an alkaline alkali metal silicate having a molar ratio of $M_2O/SiO_2$ of 1 or above wherein M is an alkali metal atom; and thereafter injecting water at an injection rate higher than said first injection rate.

11. The method defined in claim 10 wherein said alkaline alkali metal silicate is sodium or potassium orthosilicate, sodium or potassium metasilicate, sodium or potassium metasilicate pentahydrate, or potassium sesquisilicate.

12. The method defined in claim 10 wherein said aqueous alkali metal silicate solution is injected in the form of an emulsion comprised of about 0.3 to 3 volumes of a crude petroleum of the type that exhibits reduced interfacial tension at high pH per volume of said aqueous alkali metal silicate solution, and wherein said emulsion is characterized by an emulsion stability factor above about 20.

* * * * *